J. Mayes,
Washing Machine

Nº 17,166. Patented Apr. 28, 1857.

UNITED STATES PATENT OFFICE.

JOSIAH MAYES, OF COHOES, NEW YORK.

WASHING-MACHINE.

Specification of Letters Patent No. 17,166, dated April 28, 1857.

*To all whom it may concern:*

Be it known that I, JOSIAH MAYES, of Cohoes, in the county of Albany and State of New York, have invented a new and Improved Clothes-Washing Machine; and I do hereby declare that the following is a full, clear, and exact description of the same, reference being had to the annexed drawings, making a part of this specification, in which—

Figure 1:
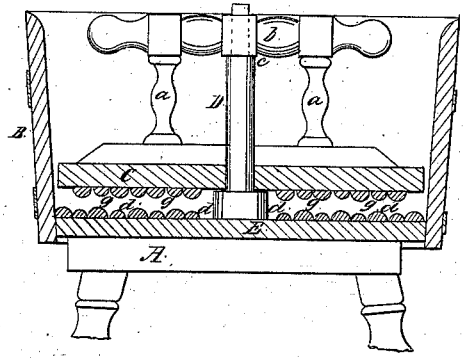
Figure 2:
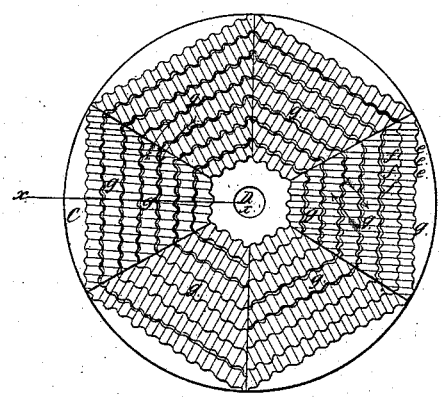
Figure 3:
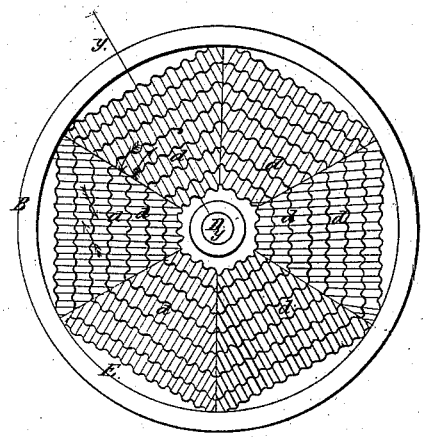

Figure 1 is a vertical section of my improvement; the plane of section being through the center. Fig. 2, is a face view of the reciprocating rotating rubber. Fig. 3, is a plan view of the tub, showing the beaded strips on its bottom.

Similar letters of reference indicate corresponding parts in the several figures.

This invention relates to an improvement in the class of washing machines of the tub form, in which a rotating reciprocating rubber is placed within a tub.

The invention consists in the peculiar manner of arranging beaded strips upon the bottom of the tub and the face of the rubber, as will be hereinafter fully shown and described, whereby the clothes will be subjected to a more perfect rubbing action than in the usual machines of this kind.

To enable those skilled in the art to fully understand and construct my invention, I will proceed to describe it.

A represents a bench on which a tub, B, is secured; and C represents a circular rubber which is fitted within the tub B. To the back of the rubber C two uprights (a) (a) are attached, the upper ends of the uprights being connected by a cross-piece (b).

D represents a vertical arbor or spindle which is secured to the center of the bottom E of the tub. This arbor or spindle passes through the center of the rubber C, and also through the center of the cross-piece (b); the cross-piece resting on a shoulder (c) at the upper part of the upright.

The above parts are constructed in the usual way, precisely the same as the tub washing machines in use, and therefore a more minute description is not necessary.

To the bottom E, of the tub, B, beaded wooden strips (d) are attached. These strips are attached to the bottom so as to form a polygonal figure, as plainly shown in Fig. 3; the strips of each section of the figure being all parallel with each other. The strips (d) are so placed, side by side, that the beads (e) on one strip fit into the recesses or concaves (f) formed by the beads of the adjoining strip. To the face or under side of the rubber C, similar strips (g) are attached in a precisely similar manner, as shown in Fig. 2. The strips (d) (g), it will be seen, instead of being attached radially upon the bottom E and rubber C, as usual, are attached so as to cross at right angles a radial line drawn from the center of the bottom E, or rubber C, to its periphery, that is, when the radial line is drawn through the center of the strips of a section, as shown by the line (x), (x), Fig. 2, and (y), (y), Fig. 3.

The requisite quantity of suds is placed in the tub B, and the clothes to be washed are placed in it; the rubber C being previously removed. The rubber C is then placed on the arbor or spindle D, the face of the rubber resting upon the clothes, and the rubber is turned back and forth in the usual manner; and owing to the position in which the strips are attached to the bottom E, and rubber C, the clothes will be subjected to considerable rubbing and friction, for the rotating motion of the rubber, and the position of the strips as described, causes the strips (g) of the rubber C to pass obliquely over the strips (d) on the bottom E, so that the clothes are subjected to an oblique rubbing action combined with a motion concentric with the tub, or in the direction of the plane of rotation of the rubber. The black arrows indicate the oblique movement given the clothes by the strips, and the red arrow the circular movement.

By this improvement, the clothes are subjected to a perfect rubbing action, and the clothes will be thoroughly washed with but a small expenditure of power and in an expeditious manner.

I am aware that beaded strips have been previously used in washing machines of various kinds, but they have not been arranged as in my machine. They have been arranged in radial positions and consequently the clothes are not subjected to the same rubbing action as in my machine; the action being much inferior, as it is in one direction only.

I do not claim the beaded strips (d), (g), irrespective of their peculiar position and arrangement, as herein shown, for they have been previously used; neither do I claim a rotating reciprocating rubber placed within a tub, for they are well known and in common use;—but,

Having thus described my invention, what I claim as new, and desire to secure by Letters Patent, is:

Attaching the beaded strips (d), (g), to the bottom E, of the tub B, and the face of the rubber C, substantially as herein shown and described, for the purpose set forth.

JOSIAH MAYES.

Witnesses:
MURRAY HUBBARD,
S. H. FOSTER.